US012651527B2

(12) United States Patent
Jeong et al.

(10) Patent No.: US 12,651,527 B2
(45) Date of Patent: Jun. 9, 2026

(54) METHOD AND APPARATUS FOR PROVIDING TRAFFIC INFORMATION TO PERSONAL MOBILITY VEHICLE

(71) Applicants: Hyundai Motor Company, Seoul (KR); Kia Corporation, Seoul (KR); Kookmin University Industry Academic Cooperation Foundation, Seoul (KR)

(72) Inventors: Gu-min Jeong, Seoul (KR); Seung Hyeon Lee, Seoul (KR); Hyun Jung Oh, Seoul (KR); A-Reum Kang, Seoul (KR); Jae Jun Ha, Hwaseong (KR)

(73) Assignees: Hyundai Motor Company, Seoul (KR); Kia Corporation, Seoul (KR); Kookmin University Industry Academic Cooperation Foundation, Seoul (KR)

( * ) Notice: Subject to any disclaimer, the term of this patent is extended or adjusted under 35 U.S.C. 154(b) by 422 days.

(21) Appl. No.: 17/230,470

(22) Filed: Apr. 14, 2021

(65) Prior Publication Data

US 2022/0058943 A1     Feb. 24, 2022

(30) Foreign Application Priority Data

Aug. 24, 2020     (KR) ........................ 10-2020-0106535

(51) Int. Cl.
*G08G 1/01*          (2006.01)
*G08G 1/095*         (2006.01)
          (Continued)

(52) U.S. Cl.
CPC ........... *G08G 1/0116* (2013.01); *G08G 1/095* (2013.01); *H04B 17/104* (2015.01); *H04W 4/40* (2018.02)

(58) Field of Classification Search
None
See application file for complete search history.

(56) References Cited

U.S. PATENT DOCUMENTS

| | | | |
|---|---|---|---|
| 2017/0262790 A1* | 9/2017 | Khasis | G01C 21/3415 |
| 2018/0128623 A1* | 5/2018 | Surnilla | G01C 21/20 |

(Continued)

FOREIGN PATENT DOCUMENTS

| | | |
|---|---|---|
| CN | 106023619 A | 10/2016 |
| CN | 109118794 A | 1/2019 |

(Continued)

OTHER PUBLICATIONS

Korean Office Action for Korean Patent Application No. 10-2020-0106535 dated Mar. 17, 2025, with English translation, 14 pages.

(Continued)

*Primary Examiner* — Angela Y Ortiz
*Assistant Examiner* — Charles Pall
(74) *Attorney, Agent, or Firm* — Fox Rothschild LLP

(57) ABSTRACT

Method and apparatus for providing traffic information to personal mobility (PM) vehicle are provided. A computer implemented method includes receiving, from a PM vehicle, at least one of Received Signal Strength Indicators (RSSIs) or Time-of-Flight (ToF) values of vehicle-to-everything messages (V2X messages) generated from roadside units (RSUs) and received by the PM vehicle, and receiving identification information and transmission time points included in the V2X messages. A position and a prediction route of the PM vehicle are deduced based on at least one of the RSSIs or the ToF values, the identification information, and the transmission time points. Then, one or more essential traffic lights among a plurality of traffic lights are determined according to the position and the prediction route of the PM vehicle and identification information of the (Continued)

one or more essential traffic lights is transmitted to the PM vehicle.

18 Claims, 9 Drawing Sheets

(51) Int. Cl.
  H04B 17/10          (2015.01)
  H04W 4/40           (2018.01)

(56)                References Cited

U.S. PATENT DOCUMENTS

| | | | | |
|---|---|---|---|---|
| 2018/0162409 | A1* | 6/2018 | Altmannshofer | ............................ G08G 1/096708 |
| 2019/0037499 | A1* | 1/2019 | Son | ................... G08G 1/096791 |
| 2020/0312142 | A1* | 10/2020 | Su | ........................ G08G 1/0116 |
| 2020/0408530 | A1* | 12/2020 | Tegerdine | ............ G01C 21/165 |
| 2021/0065551 | A1* | 3/2021 | Manohar | ................ G08G 1/167 |
| 2022/0107382 | A1* | 4/2022 | Hwang | ................. G01S 5/0284 |

FOREIGN PATENT DOCUMENTS

| | | | | |
|---|---|---|---|---|
| JP | 2010-085256 A | 4/2010 | | |
| KR | 20160137442 A | * 11/2016 | ............ B60R 1/081 |
| KR | 10-2020-0063859 A | 6/2020 | |
| KR | 10-2020-0093497 A | 8/2020 | |
| WO | 2014/010407 A1 | 1/2014 | |
| WO | 2018/233699 A1 | 12/2018 | |

OTHER PUBLICATIONS

Office Action for Chinese Patent Application No. 202110644336.1 dated Feb. 4, 2026 from China State Intellectual Property Office, with English translation, 20 pages.

\* cited by examiner

*100*

Receiving Unit — *102*

Deducing Unit — *104*

Determining Unit — *106*

Transmitting Unit — *108*

| | V2X Message | Subsequent V2X Message | Time Interval |
|---|---|---|---|
| RSU1 | $t_1$ | $t_1'$ | $T_1$ |
| RSU2 | $t_2$ | $t_2'$ | $T_2$ |
| RSU3 | $t_3$ | $t_3'$ | $T_3$ |

FIG. 3C

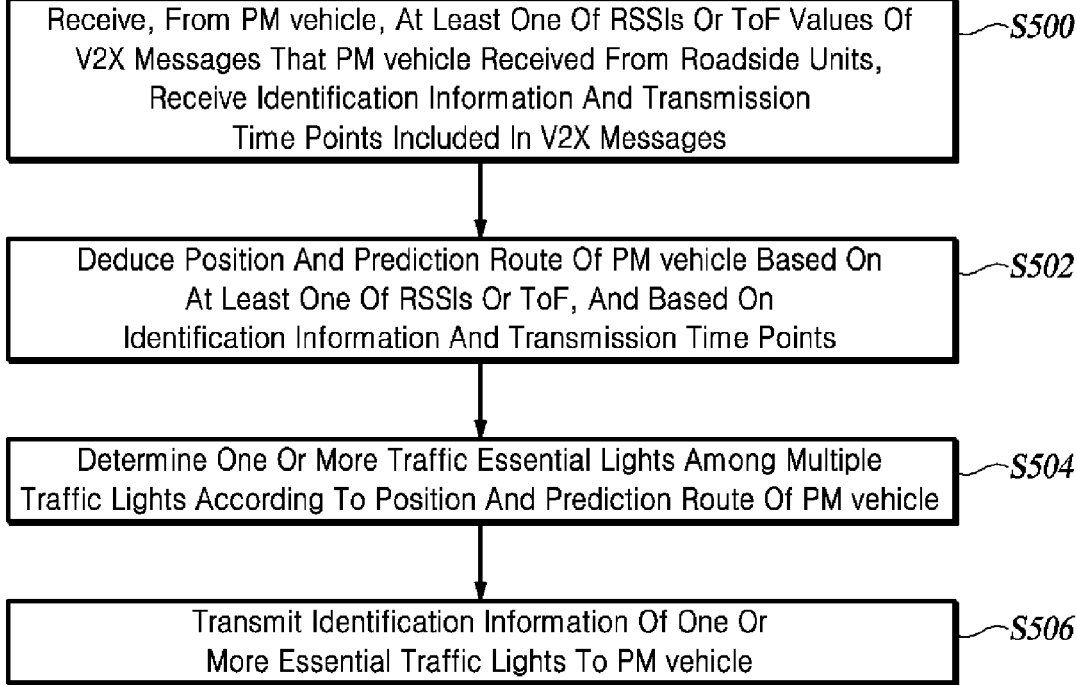

| Receive, From PM vehicle, At Least One Of RSSIs Or ToF Values Of V2X Messages That PM vehicle Received From Roadside Units, Receive Identification Information And Transmission Time Points Included In V2X Messages | ⟋S500 |

| Deduce Position And Prediction Route Of PM vehicle Based On At Least One Of RSSIs Or ToF, And Based On Identification Information And Transmission Time Points | ⟋S502 |

| Determine One Or More Traffic Essential Lights Among Multiple Traffic Lights According To Position And Prediction Route Of PM vehicle | ⟋S504 |

| Transmit Identification Information Of One Or More Essential Traffic Lights To PM vehicle | ⟋S506 |

FIG. 5

METHOD AND APPARATUS FOR PROVIDING TRAFFIC INFORMATION TO PERSONAL MOBILITY VEHICLE

CROSS-REFERENCE TO RELATED APPLICATION

This application is based on, and claims priority from, Korean Patent Application Number 10-2020-0106535, filed Aug. 24, 2020, the disclosure of which is incorporated by reference herein in its entirety.

TECHNICAL FIELD

The present disclosure relates to a method and an apparatus for providing traffic information to a personal mobility vehicle (PM vehicle), and more particularly, to a method and an apparatus for providing traffic information to a PM vehicle, which more accurately identify the position of the PM vehicle through vehicle-to-everything (V2X) communications, deduce prediction route or a driving direction of the PM vehicle, and provide the traffic information based on the prediction route or driving direction.

BACKGROUND

To improve traffic flow in recent years, pilot demonstration sites are being set up for an intelligent transport system (ITS) to conduct studies on a service for providing vehicles with traffic light information. In general, an intelligent transport system broadcasts signal information through a pre-built infrastructure. Therefore, for a vehicle to accurately receive signal information broadcast from the infrastructure, the vehicle needs to know its position. Based on its position, the vehicle may select and receive signal information of which one of the traffic lights to obey.

A Global Navigation Satellite System (GNSS) based on satellite signals is generally used to determine the vehicle position. An example of GNSS is a Global Positioning System (GPS). Additionally, V2X standard technology applied to intelligent transport systems also estimates the vehicle position based on GPS. However, in an urban area packed with high-rise buildings, the GPS signal is diffusely reflected by those buildings. GPS diffuse reflection can impede the transmission of GPS signals from reaching the destination in the shortest distance, reducing positioning accuracy. Additionally, the difficulty to receive satellite signals in a GPS dead zone such as an indoor parking lot makes it harder to determine the vehicle position.

To solve this impediment requires the use of an additional apparatus in a GPS shaded area or an urban area. In addition to GPS technology, a GPS-based positioning method may use a map matching technology that displays the vehicle's position as a position mark on the nearest road. Additionally, an Inertial Navigation System (INS) may be used to reduce the inaccuracy of GPS and to receive additional information necessary for positioning in the GPS dead zone. However, even with both GPS and INS used, there is a limit to reducing the positioning error since the positional estimation is based on the satellite signal transmitted from the satellite.

On the other hand, as a means of human/cargo transportation in recent years, high-occupancy vehicles are decreasing in inverse proportion to personal mobility vehicles (PM vehicles) which are on the rise. Particularly, the PM vehicle is a transporter for one or two persons and refers to a means of transportation including an electric kickboard, a bicycle, a motorbike, a smart car, a vehicle, a Purpose Built Vehicle (PBV), an aircraft, etc. Vehicle-related technologies are being studied in various fields, whereas research on PM vehicle is insufficient.

Attempting to divert an application of GPS-based technology for providing a high-occupancy vehicle with traffic signal information to personal mobility vehicles would only further pronounce the inaccuracy of the existing GPS positioning error. This is because, unlike vehicles that are supposed to run on roadways, PM vehicle are expected to drive across various routes such as sidewalks, driveways, bicycle lanes, or alleyways. Therefore, informing the PM vehicle of traffic through GPS positioning is a difficult task to realize due to the outstanding positioning error.

SUMMARY

According to at least one aspect, the present disclosure provides a computer implemented method for providing traffic information to a personal mobility vehicle (PM vehicle), including receiving, from a PM vehicle, at least one of Received Signal Strength Indicators (RSSIs) or Time-of-Flight (ToF) values of vehicle-to-everything messages (V2X messages) generated from roadside units (RSUs) and received by the PM vehicle, and receiving identification information and transmission time points included in the V2X messages; deducing a position and a prediction route of the PM vehicle based on at least one of the RSSIs or the ToF values, the identification information, and the transmission time points; determining one or more essential traffic lights among a plurality of traffic lights according to the position and the prediction route of the PM vehicle; and transmitting identification information of the one or more essential traffic lights to the PM vehicle.

According to another aspect, the present disclosure provides a computer implemented method for providing traffic information to a personal mobility vehicle (PM vehicle), including receiving, from roadside units (RSUs), vehicle-to-everything messages (V2X messages) including identification information and transmission time points of the V2X messages; deducing a position and a prediction route of a PM vehicle based on at least one of Received Signal Strength Indicators (RSSIs) or Time-Of-Flight (ToF) values of the V2X messages, and based on the identification information of the roadside units and the transmission time points; determining one or more essential traffic lights among a plurality of traffic lights according to the position and the prediction route of the PM vehicle; receiving signal information from the one or more essential traffic lights based on identification information of the one or more essential traffic lights; and outputting the signal information of the one or more essential traffic lights.

According to another aspect, the present disclosure provides a device for providing traffic information to a personal mobility vehicle (PM vehicle), including a receiving unit configured to receive, from a PM vehicle, at least one of Received Signal Strength Indicators (RSSIs) or Time-Of-Flight (ToF) values of vehicle-to-everything messages (V2X messages) generated from roadside units (RSUs) and received by the PM vehicle, and to receive identification information and transmission time points included in the V2X messages; a deducing unit configured to deduce a position and a prediction route of the PM vehicle based on at least one of the RSSIs or the ToF values, the identification information, and the transmission time points; a determining unit configured to determine one or more essential traffic lights among a plurality of traffic lights according to the position and the prediction route of the PM vehicle; and a transmitting unit configured to transmit identification information of the one or more essential traffic lights to the PM vehicle.

According to another aspect, the present disclosure provides a device for providing traffic information to a personal mobility vehicle (PM vehicle), including a first receiving unit configured to receive, from roadside units (RSUs), vehicle-to-everything messages (V2X messages) including identification information and transmission time points of the V2X messages; a deducting unit configured to deduce a position and a prediction route of a PM vehicle based on at least one of Received Signal Strength Indicators (RSSIs) or Time-Of-Flight (ToF) values of the V2X messages, and based on the identification information of the roadside units and the transmission time points; a determining unit configured to determine one or more essential traffic lights among a plurality of traffic lights according to the position and the prediction route of the PM vehicle; a second receiving unit configured to receive signal information from the one or more essential traffic lights based on identification information of the one or more essential traffic lights; and an output unit configured to output the signal information of the one or more essential traffic lights.

BRIEF DESCRIPTION OF THE DRAWINGS

The above and other objects, features and advantages of the disclosure invention will be more clearly understood from the following detailed description taken in conjunction with the accompanying drawings, in which:

FIGS. 3A, 3B, and 3C are diagrams illustrating a process of deducing a prediction route of a PM vehicle.

FIG. 5 is a flowchart of a method of operating a traffic information providing device located outside a PM vehicle.

REFERENCE NUMERALS

Figure 1A:
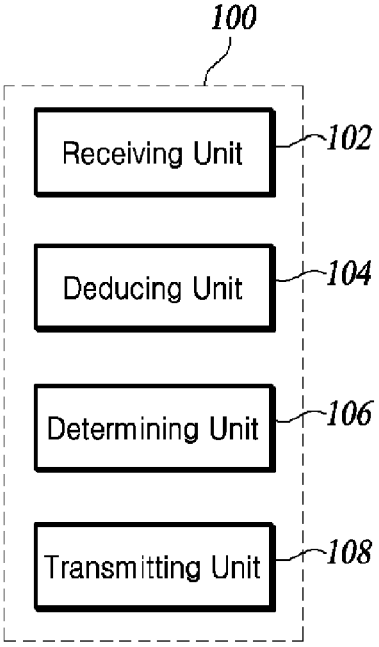
FIGS. 1A and 1B are diagrams of the configurations of traffic information providing devices located outside and inside a PM vehicle, respectively.

100: traffic information providing device
102: receiving unit
104: deducing unit
106: determining unit
108: transmitting unit

DETAILED DESCRIPTION

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure in some exemplary embodiments seeks to provide a traffic information providing device and a method for informing the PM vehicle of traffic signals according to a position and a prediction route of the PM vehicle and thereby smooth the traffic flow of the PM vehicle and promote user convenience.

Other exemplary embodiments of the present disclosure seek to provide a traffic information providing device and a method which more accurately inform the PM vehicle of traffic signals according to the position of the PM vehicle by more accurately identifying the position of the PM vehicle not only across city streets but also in an indoor space or a GPS dead zone.

Yet other exemplary embodiments of the present disclosure seek to provide a traffic information providing device and a method unlike a satellite signal-based GPS, which, however, utilize roadside units at fixed positions to estimate the position of the PM vehicle and subsequently perform an additional correction process and thereby reduce positioning errors.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. The terms such as 'unit', 'module', and the like refer to one or more units for processing at least one function or operation, which may be implemented by hardware, software, or a combination thereof.

In the following, a personal mobility vehicle (hereinafter, PM vehicle) refers to a transporter for one or two persons to board and travel about. For example, the transporter may include micro-mobility, electric bicycle, electric kickboard, electric scooter, electric wheelchair, electric motorbike, Segway, 2-wheel drive, smart car, 1-2 seater shuttle, personal transportation, personal flight, smart mobility, shared mobility, first mile, last mile, purpose-built vehicle (PBV), personal air vehicle (PAV), vehicles, electric vehicles, etc.

Additionally, roadside units (RSUs) and a plurality of traffic lights all perform broadcasting, while supporting communication methods such as unicast and multicast as needed. Hereinafter, roadside units are described as performing vehicle-to-everything (V2X) communications with PM vehicle, although they can use any other unlimited communication standards, including LTE-V2X, C-V2X, 5G-V2X, Wireless Access in Vehicular Environments (WAVE), Dedicated Short Range Communication (DSRC), etc. Accordingly, at least one embodiment utilizes such communication standards as used by the Intelligent Transport System (ITS).

FIG. 1A is a diagram of a configuration of a traffic information providing device 100 located outside a PM vehicle. As shown in FIG. 1A, the traffic information providing device 100 according to at least one exemplary embodiment may include a receiving unit 102, a deducing unit 104, a determining unit 106, and a transmitting unit 108. Each of the units may be operated by a controller. The traffic information providing device 100 is preferably implemented as, but not limited to, a server located outside the PM vehicle, and it may be implemented by a device located inside the PM vehicle, a roadside unit, a base station, or the like. Meanwhile, the traffic information providing device 100 may be configured to store in advance at least one of a virtual map, identification information of roadside units, location coordinates corresponding to identification information of the roadside units, identification information and location coordinates of a plurality of traffic lights, identification information of a PM vehicle, user's subscriber information, and moving routes of individual users. In particular, the location coordinates refer to latitude and longitude or two-dimensional or three-dimensional coordinates with reference to a specific point.

The receiving unit 102 may be configured to receive, from the PM vehicle, information related to V2X messages that the PM vehicle received from the adjacent roadside units. In particular, the information related to the V2X messages refers to at least one of received signal strength indicators (RSSIs) or time-of-flight (ToF) values of signals received by the PM vehicle from adjacent roadside units, and to identification information and transmission time points included in the V2X messages.

The deducing unit 104 may be configured to deduce or determine the position and the prediction route of the PM vehicle based on at least one of the RSSIs or the ToF values, the identification information, and the transmission time points. To deduce the position of the PM vehicle, the deducing unit 104 may be configured to calculate the distances between the PM vehicle and the roadside units based on at least one of the RSSIs or the ToF values of the signals generated from the roadside units and received by the PM vehicle. The deducing unit 104 may be configured to deduce the position of the PM vehicle based on the distances between the PM vehicle and the roadside units, and the positions of the roadside units. At this time, the deducing unit 104 may be configured to deduce the position of the PM vehicle using a positioning method such as triangulation or multilateration.

Additionally, to deduce the prediction route of the PM vehicle, the receiving unit 102 may be configured to receive, from the PM vehicle having moved on, subsequent V2X messages that the PM vehicle received from the roadside units. The deducing unit 104 may be configured to determine the driving direction of the PM vehicle based on at least one of the transmission time points of the previous V2X messages and transmission time points of the subsequent V2X messages, time intervals between the transmission points of the previous V2X messages and the transmission points of the subsequent V2X messages, and the positions of the roadside units. Thereafter, the deducing unit 104 may be configured to deduce the prediction route of the PM vehicle according to the driving direction of the PM vehicle. The detailed process will be described in FIGS. 3A, 3B, and 3C.

To deduce the prediction route of the PM vehicle, the receiving unit 102 may further be configured to receive, from the PM vehicle, destination information that the PM vehicle received from the user. The deducing unit 104 may be configured to deduce a prediction route based on the position and destination information of the PM vehicle. In particular, when the position of the PM vehicle deviates from the prediction route, the deducing unit 104 may be configured to reset the prediction route based on the deviated position of the PM vehicle.

To deduce the prediction route of the PM vehicle, the deducing unit 104 may be configured to use a prediction model trained through machine learning. The receiving unit 102 may be configured to receive, from the PM vehicle, subscriber information and destination information that the PM vehicle received from the user. In particular, the user's subscriber information may include the user's identification information, age, gender, preference, and the like. The deducing unit 104 may be configured to deduce the prediction route of the PM vehicle using a prediction model based on subscriber information, destination information, and the position of the PM vehicle. The prediction model have been trained to output a route of PM vehicle based on a set of training data including subscriber information, destination information, positions of PM vehicles. For example, the prediction model may include a deep neural network (DNN) and may be subjected to supervised learning to output the prediction route of the PM vehicle upon receiving subscriber information, destination information, and the position of the PM vehicle as training data. Besides, the prediction model may be trained to deduce the prediction route of the PM vehicle using a recurrent neural network (RNN), a convolution neural network (CNN), or the like. The prediction model may be trained to output the prediction route differently according to the subscriber information.

The determination unit 106 may be configured to determine one or more essential traffic lights among a plurality of traffic lights based on the position and the prediction route of the PM vehicle. In particular, the plurality of traffic lights refer to all traffic lights located around the PM vehicle, and the one or more essential traffic lights refer to essential traffic lights required for smooth driving of the PM vehicle. Other traffic lights than the essential traffic lights are referred to as optional traffic lights.

The essential traffic lights may include at least one of a vehicle traffic light located on a straight path of the PM vehicle, a crosswalk traffic light located on a left turn path, or a crosswalk traffic light located on a right turn path. The user may obey signal information of the essential traffic lights alone to smoothly drive in any one of a left turn path, a right turn path, or a straight path. The one or more essential traffic lights further include at least one of a vehicle traffic light located on the left turn path of the PM vehicle or a vehicle traffic light located on the right turn path. In particular, the PM vehicle may be configured to receive the identification information of the one or more essential traffic lights and then autonomously select the traffic lights required for driving to receive the traffic light information.

The transmitter 108 may be configured to transmit the identification information of the one or more essential traffic lights to the PM vehicle. The PM vehicle may be configured to receive signal information broadcasted by one or more essential traffic lights by using the identification information thereof. In other words, the PM vehicle may be configured to receive only signal information related to the essential traffic lights located in the prediction route of the PM vehicle among the plurality of traffic lights that broadcast signals. In particular, the signal information transmitted by the one or more essential traffic lights may include at least one of a type of signal, a remaining time of a signal, or an upcoming signal. The type of signal refers to at least one of a green signal, a yellow signal, a red signal, a left turn signal, a right turn signal, and a pedestrian signal. The upcoming signal refers to the subsequent traffic light's signal type or color. The remaining time of signal refers to the time taken for the current signal type of the traffic light to change to the next signal type.

The traffic information providing device 100 may be configured to provide, in addition to the identification information of the essential traffic lights to the PM vehicle, at least one of a traffic volume according to the prediction route, an accident event notification, pre-stored road sign information, or the identification information of the plurality of traffic lights. Specifically, the receiving unit 102 may be configured to receive, from an intelligent traffic system, traffic information including at least one of a traffic volume along the prediction route of the PM vehicle or an accident event notification. The transmitter 108 may be configured to transmit, to the PM vehicle, traffic information including at least one of the traffic volume according to the prediction route of the PM vehicle, accident event notification, pre-stored sign information, or identification information of the plurality of traffic lights.

On the other hand, the traffic information providing device 100 may further be configured to transmit a pre-stored virtual map or high-definition map (HD map) to the PM vehicle. Specifically, the traffic information providing device 100 may be configured to perform mapping of at least one of the identification information of the plurality of traffic lights, traffic volume according to the prediction route, accident event notification, or pre-stored sign information, to a high-definition map, and then transmit the mapped high-definition map to the PM vehicle. The PM vehicle may be configured to receive signal information from the traffic light by using the identification information of the traffic lights mapped on the high-definition map. Additionally, the PM vehicle may be configured to autonomously perform mapping of signal information to a high-definition map and output the autonomously mapped high-definition map.

Figure 1B:
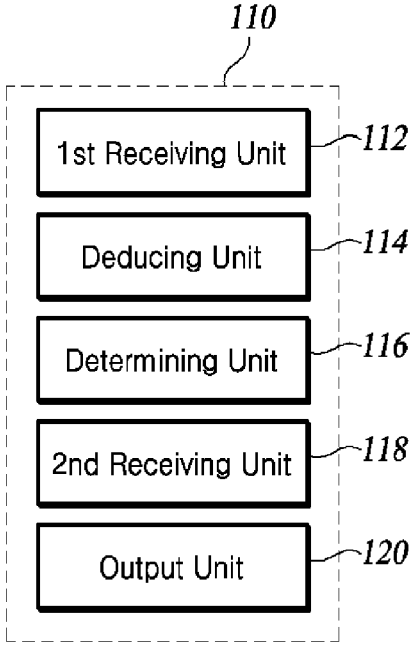

FIG. 1B is a diagram of a configuration of a traffic information providing device located inside a PM vehicle. As shown in FIG. 1B, a traffic information providing device 110 may include a first receiving unit 112, a deducing unit 114, a determining unit 116, a second receiving unit 118, and an output unit 120. In particular, the first receiving unit 112 and the second receiving unit 118 may be implemented as a single component. The traffic information providing device 110 may be implemented as, but not limited to, a device inside the PM vehicle, and it may be implemented by a user terminal, a smartphone, or a device attached to the PM vehicle.

In the following, since the deducing unit 114 and the determining unit 116 operate in the same manner as the deducing unit 104 and the determining unit 106 in FIG. 1A, detailed descriptions thereof are omitted. Additionally, a description of contents applicable to FIG. 1B among the contents of the configuration of FIG. 1A will be omitted.

The first receiver 112 may be configured to receive, from adjacent roadside units, V2X messages including identification information of the adjacent roadside units, and transmission time points of the V2X messages. The first receiver 112 may be configured to receive V2X messages from the roadside units in a predetermined periodic cycle. The deducing unit 114 may be configured to utilize the V2X messages to deduce the position and the prediction route of the PM vehicle, and the determination unit 116 may be configured to determine one or more essential traffic lights among the plurality of traffic lights according to the position and the prediction route of the PM vehicle.

The second receiver 118 may be configured to receive signal information from the one or more essential traffic lights based on the identification information thereof. Additionally, the second receiver 118 may further be configured to receive, from a server, traffic information including at least one of a traffic volume according to the prediction route or an accident event notification. The output unit 120 may be configured to audibly or visually output the signal information of the one or more essential traffic lights. Additionally, the output unit 120 may further be configured to output the traffic information including at least one of the traffic volume according to the prediction route or the accident event notification. In particular, the output unit 120 may be configured to map the traffic information to a pre-stored high-definition map or virtual map and output the mapped high-definition map or virtual map.

Figure 2A:
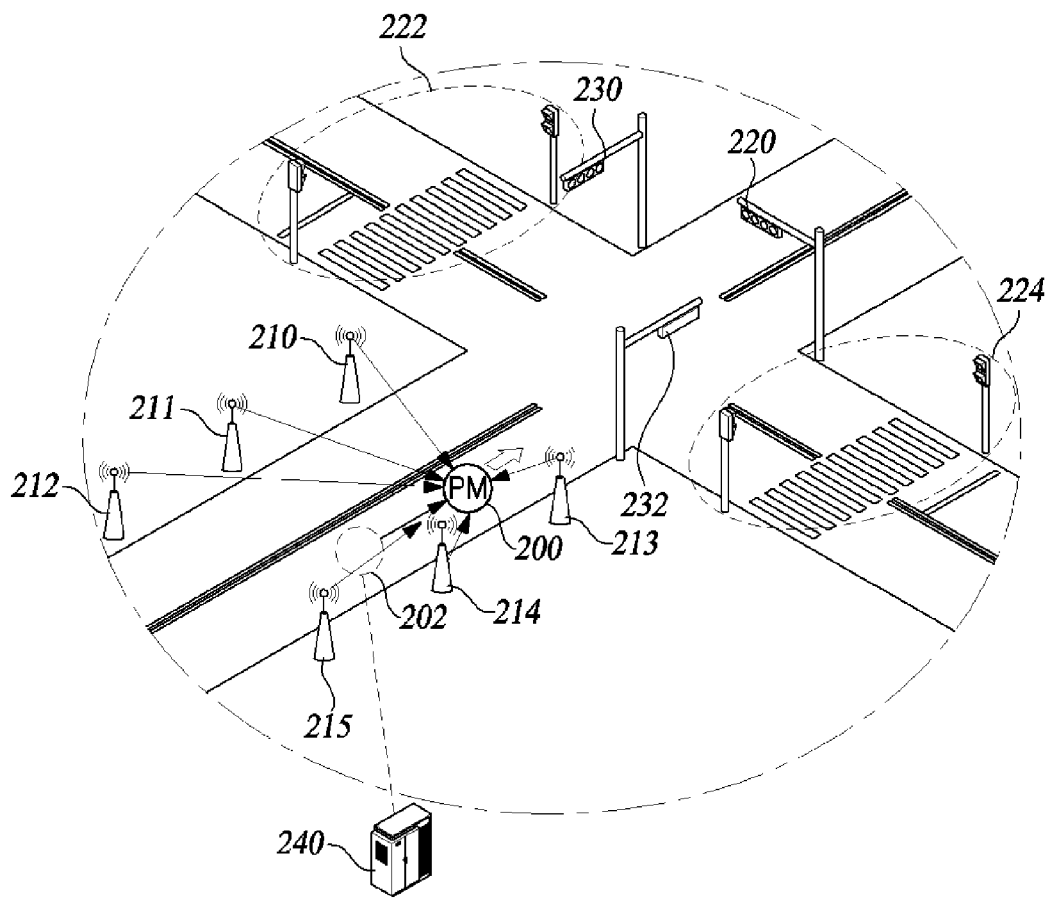
FIGS. 2A and 2B are diagrams illustrating methods of operating traffic information providing devices located outside and inside a PM vehicle, respectively.

FIG. 2A is a diagram illustrating a method of operating a traffic information providing device located outside a PM vehicle. FIG. 2A shows a PM vehicle 200, a previous position 202 of the PM vehicle 200, a plurality of roadside units 210, 211, 212, 213, 214, 215, a plurality of traffic lights 220, 222, 224, 230, 232, and a server 240. The plurality of roadside units 210, 211, 212, 213, 214, 215 include a first roadside unit 210, a second roadside unit 211, a third roadside unit 212, a fourth roadside unit 213, a fifth roadside unit 214, and a sixth roadside unit 215. The plurality of traffic lights 220, 222, 224, 230, 232 include essential traffic lights 220, 222, 224 and optional traffic lights 230, 232, wherein the essential traffic lights 220, 222, 224 include a vehicle traffic light 220, a first crosswalk traffic light 222, and a second crosswalk traffic light 224.

The PM vehicle 200 may be configured to move to the current position from the previous position 202 and receive V2X messages from its adjacent plurality of roadside units 210, 211, 212, 213, 214, 215. At this time, the plurality of roadside units 210, 211, 212, 213, 214, 215 may be configured to transmit the V2X messages in the form of broadcasting. In particular, the V2X message may include identification information of a roadside unit that transmitted the same message and information on its transmission time point. In response to receiving the V2X messages from the plurality of roadside units 210, 211, 212, 213, 214, 215, the PM vehicle 200 may be configured to measure at least one of received signal strength indicators (RSSIs) or time-of-flight (ToF) values of the received V2X messages.

The server 240 may be configured to receive, from the PM vehicle 200, at least one of the RSSIs or the ToF values of the V2X messages that the PM vehicle 200 received from the plurality of roadside units 210, 211, 212, 213, 214, 215, and receive identification information and transmission time points included in the V2X messages. The server 240 may be configured to deduce the position and the prediction route of the PM vehicle 200 based on at least one of the RSSIs or the ToF values of the V2X messages, and based on the identification information and the transmission time points. The following description assumes that the prediction route of the PM vehicle 200 is in a straight direction.

The server 240 may be configured to determine one or more essential traffic lights among the plurality of traffic lights according to the position and the prediction route of the PM vehicle. In particular, the one or more essential traffic lights according to at least one exemplary embodiment refer to the essential traffic lights 220, 222, 224. Of the essential traffic lights 220, 222, 224, the vehicle traffic light 220 is a light located on the straight path of the PM vehicle 200, the first crosswalk traffic light 222 is located on the left turn path of the PM vehicle 200, and the second crosswalk traffic light 224 is located on the right turn path of the PM vehicle 200.

The server 240 may be configured to transmit identification information of the one or more essential traffic lights to the PM vehicle 200. The PM vehicle may be configured to select, from the plurality of traffic lights, the one or more essential traffic lights based on the identification information thereof and receive, from the one or more essential traffic lights, signal information necessary for driving of the PM vehicle 200. The server 240 according to at least one exemplary embodiment may be configured to map the identification information of the one or more essential traffic lights to a virtual map or high-definition map (HD map) and then transmit the mapped HD map to the PM vehicle 200. In particular, the PM vehicle 200 may be configured to receive the signal information from the one or more essential traffic lights, map the signal information to the virtual map or HD map, and then audibly or visually output the mapped HD map to the user.

Figure 2B:
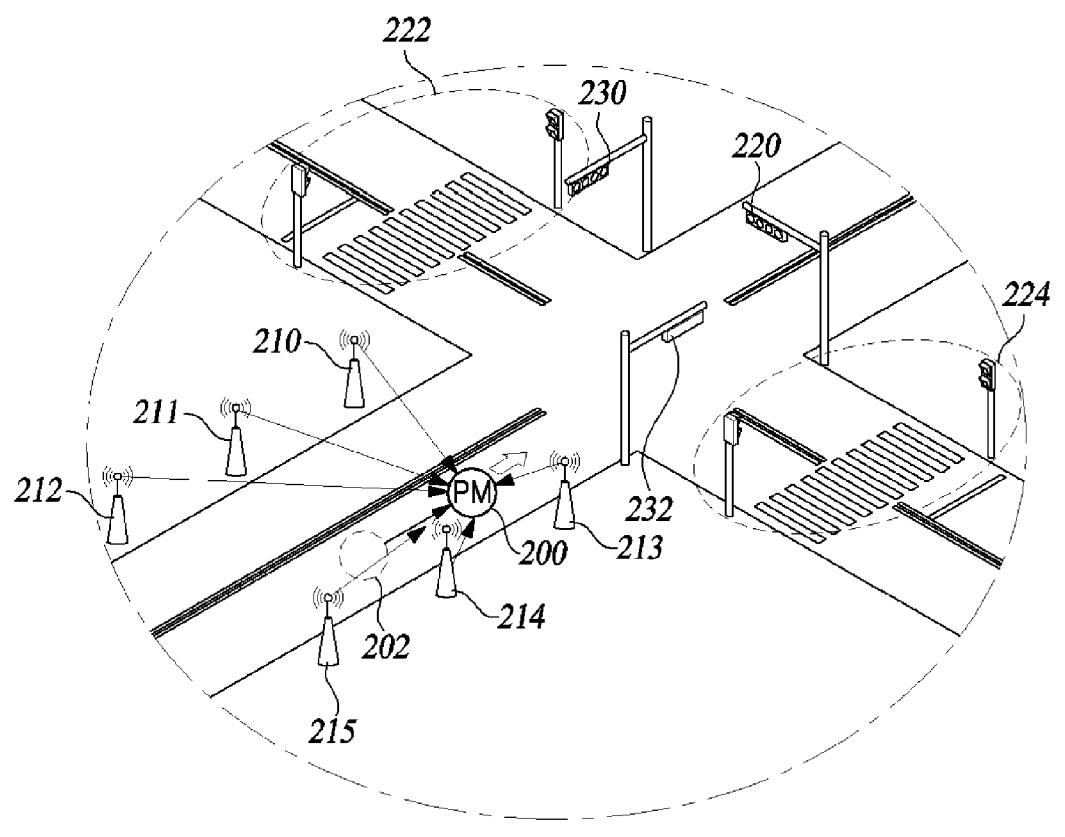

FIG. 2B is a diagram illustrating a method of operating a traffic information providing device located inside a PM vehicle. FIG. 2B shows the PM vehicle 200, a previous position 202 of the PM vehicle 200, the plurality of roadside units 210, 211, 212, 213, 214, 215, and the plurality of traffic lights 220, 222, 224, 230, 232. Hereinafter, the traffic information providing device is described as being located inside the PM vehicle, which, however, is merely an illustrative embodiment, and the traffic information providing device may be attached to the outside of the PM vehicle 200 or implemented as a user terminal.

The PM vehicle 200 may be configured to move to the current position from the previous position 202, and the traffic information providing device may be configured to receive V2X messages from its adjacent plurality of roadside units 210, 211, 212, 213, 214, 215. In response to receiving the V2X messages from the plurality of roadside units 210, 211, 212, 213, 214, 215, the traffic information providing device may be configured to measure at least one of received signal strength indicators or time-of-flight values of the V2X messages received by the PM vehicle 200.

The traffic information providing device may be configured to deduce the position and the prediction route of the PM vehicle based on at least one of the RSSIs or the ToF values of the V2X messages that the PM vehicle received from the plurality of roadside units 210, 211, 212, 213, 214, 215, and based on the identification information included in the V2X messages and the transmission time points of the V2X messages. The traffic information providing device may be configured to determine one or more essential traffic lights among the plurality of traffic lights according to the position and the prediction route of the PM vehicle. In particular, the one or more essential traffic lights according to at least one exemplary embodiment refer to essential traffic lights 220, 222, and 224. The identification information of the one or more essential traffic lights is information pre-stored in the traffic information providing device.

The traffic information providing device may be configured to select and receive signal information required for driving of the PM vehicle 200 based on the identification information of the one or more essential traffic lights. Thereafter, the traffic information providing device may be configured to output the signal information received from the one or more essential traffic lights. The traffic information providing device according to at least one exemplary embodiment may be configured to map the identification information of the one or more essential traffic lights onto a virtual map or a HD map, and then audibly or visually output the mapped HD map to the user.

Figure 3A:
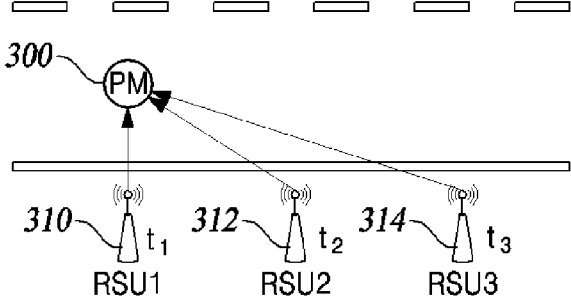
Figure 3B:
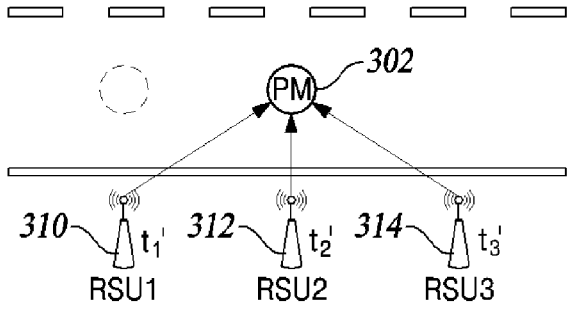

FIGS. 3A, 3B, and 3C are diagrams illustrating a process of deducing a prediction route of a PM vehicle. FIGS. 3A and 3B show a pre-move position 300 of a PM vehicle, a post-move position 302 of the PM vehicle, and the plurality of roadside units 310, 312, and 314. The plurality of roadside units 310, 312, 314 include a first roadside unit 310, a second roadside unit 312, and a third roadside unit 314. Hereinafter, a traffic information providing device (not shown) is described as being located inside the PM vehicle, although it may be implemented by a server outside the PM vehicle.

At the pre-move position 300 of the PM vehicle, the traffic information providing device may be configured to receive V2X messages from the plurality of roadside units 310, 312, 314. The respective V2X messages include the identification information of the respective roadside units and the transmission time points of the respective V2X messages, wherein the transmission time points are $t_1$, $t_2$, and $t_3$, respectively. At the post-move position 302 of the PM vehicle, the traffic information providing device may be configured to receive subsequent V2X messages from the plurality of roadside units 310, 312, 314, wherein the transmission time points of the roadside units are $t_1$, $t_2$, and $t_3$, respectively.

FIG. 3C shows the transmission time points and time intervals of the V2X messages and the subsequent V2X messages that the traffic information providing device received from the plurality of roadside units 310, 312, 314. The traffic information providing device according to at least one exemplary embodiment may further be configured to utilize the subsequent V2X messages that the traffic information providing device received after the PM vehicle moved and thereby deducing a prediction route of the PM vehicle. The traffic information providing device may be configured to calculate the time intervals which are the transmission time differences between the V2X messages and the subsequent V2X messages received from the plurality of roadside units 310, 312, 314. In particular, the time intervals refer to the transmission time differences between the V2X messages and the subsequent V2X messages. For example, $T_1=t'_1-t_1$, expressing the time interval of the first roadside unit.

Referring back to FIG. 3A, to deduce the prediction route of the PM vehicle, the traffic information providing device may be configured to detect a roadside unit that is slower in V2X message transmission as a closer roadside unit to the PM vehicle. For example, when $t_1>t_2>t_3$, that is, where the third roadside unit 314 is the fastest to perform the V2X message transmission and the first roadside unit 310 is the slowest to perform the V2X message transmission, the traffic information providing device may be configured to determine that the first roadside unit 310 is closest to the PM vehicle and the third roadside unit 314 is located farthest.

The traffic information providing device according to at least one exemplary embodiment may be configured to deduce a prediction route of the PM vehicle moving from its pre-move position 300 by the first roadside unit 310 toward the second roadside unit 312, and therefrom toward the third roadside unit 314. On the other hand, the traffic information providing device according to some exemplary embodiments may be configured to deduce the prediction route by using at least one of the RSSIs or the ToF values instead of the transmission time points of the V2X messages.

Setting a PM vehicle aside, the roadside units are each supposed to deliver a V2X message at a faster transmission time point and a subsequent V2X message at a slower transmission time point. From the standpoint of the PM vehicle as it moves farther away, the first roadside unit 310 has decreasing time interval, $T_1=t'_1-t_1$ between the transmission time point of the subsequent V2X message and the transmission time point of the V2X message. On the contrary, since the third roadside unit 314 gets closer to the PM vehicle, the third roadside unit 314 has an increasing time interval, $T_3=t'_3-t_3$. Accordingly, the traffic information providing device may be configured to determine that a roadside unit, whose time interval increases as the PM vehicle proceeds, is coming closer to the PM vehicle. The apparatus or traffic information providing device may also be configured to determine that a roadside unit, whose time interval decreases as the PM vehicle proceeds, is going farther from the PM vehicle. Finally, the traffic information providing device may be configured to predict that the PM vehicle will move from a roadside unit whose time interval decreases as the PM vehicle proceeds to another roadside unit whose time interval increases as the PM vehicle proceeds.

The traffic information providing device according to at least one exemplary embodiment may be configured to deduce a prediction route based on at least one of the RSSIs or the ToF values. Specifically, the traffic information providing device may be configured to determine a roadside unit as approaching the PM vehicle when that roadside unit has increasing received signal strength indicator or decreasing time-of-flight as the PM vehicle proceeds. On the contrary, the traffic information providing device may be configured to determine a roadside unit as moving away from the PM vehicle when that roadside unit has decreasing received signal strength indicator or increasing time-of-flight as the PM vehicle proceeds. This allows the prediction route of the PM vehicle to be deduced.

Figure 4A:
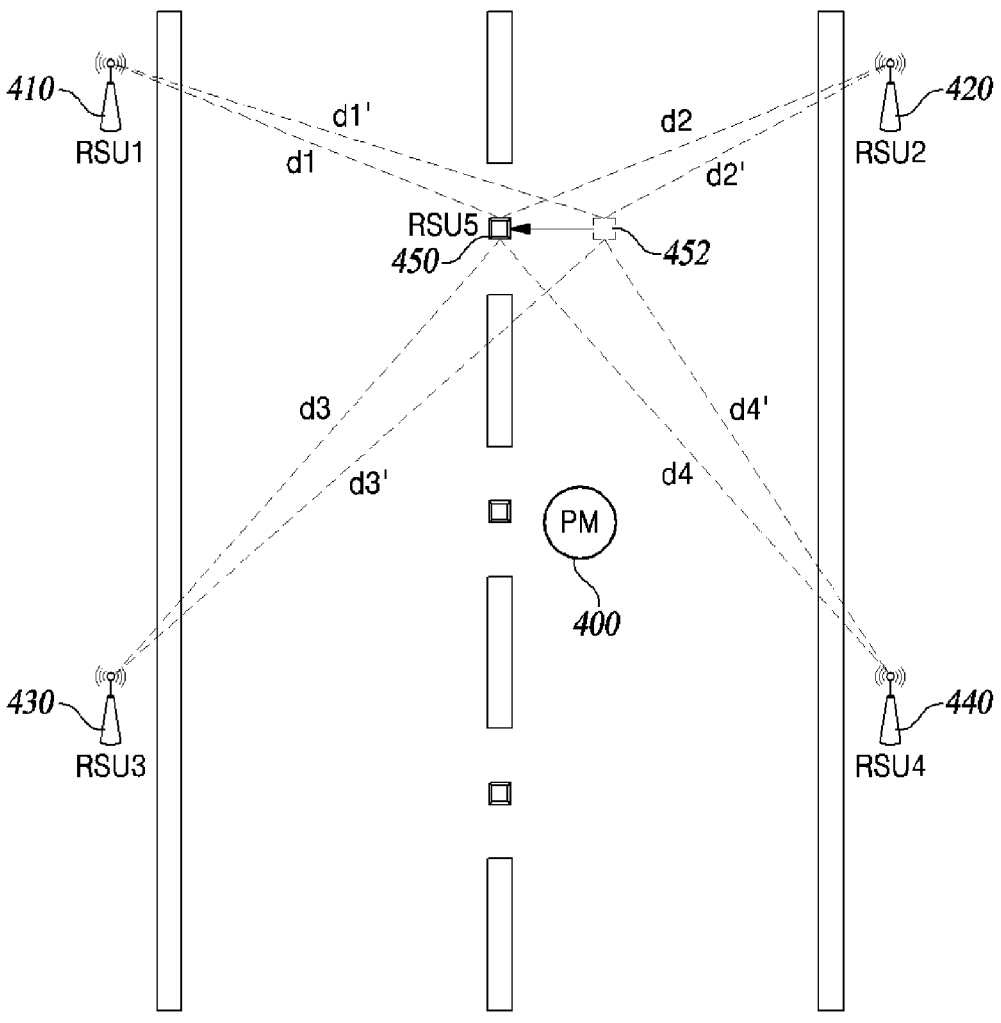
FIGS. 4A and 4B are diagrams illustrating a process of estimating an accurate position of a PM vehicle.
Figure 4B:
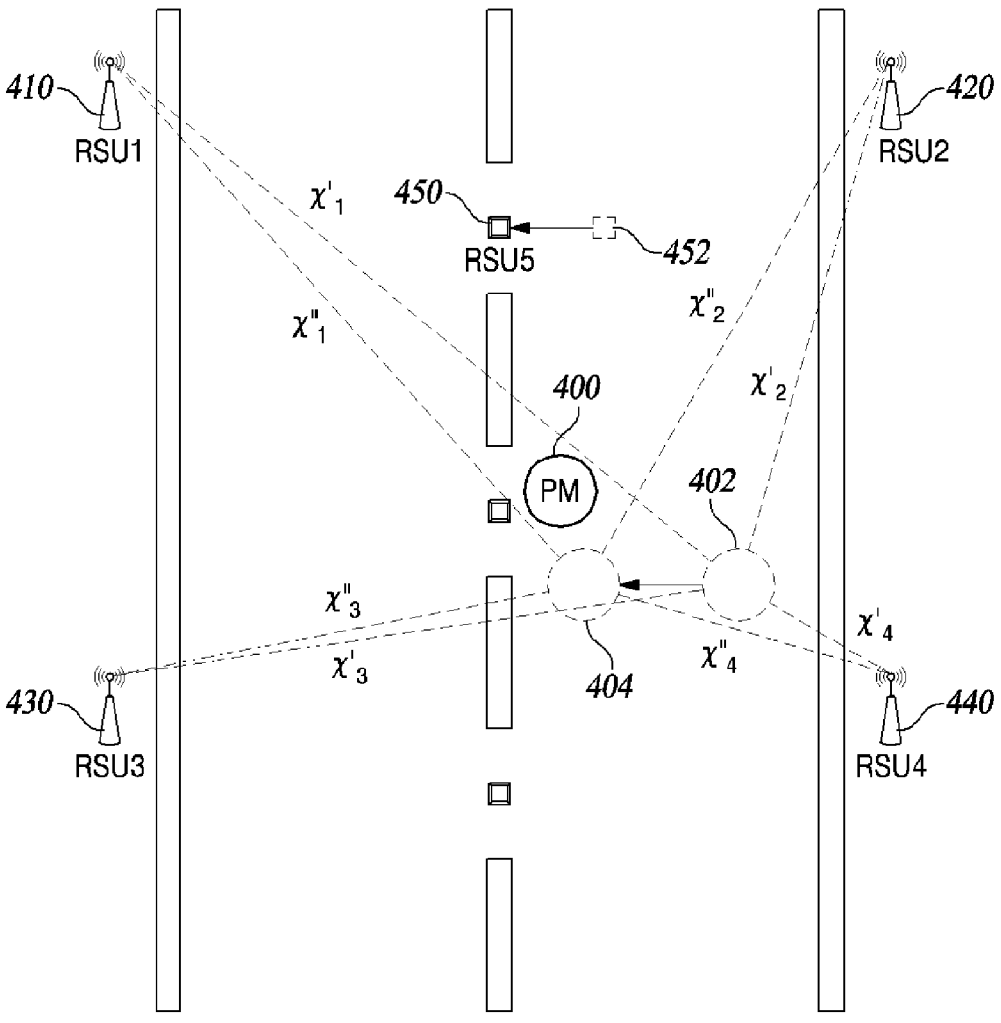

FIGS. 4A and 4B are diagrams illustrating a process of estimating a more accurate position of a PM vehicle. FIG. 4A shows an actual position 400 of a PM vehicle, a plurality of roadside units 410, 420, 430, 440, 450, and an estimated position 452 of a fifth roadside unit. The plurality of roadside units 410, 420, 430, 440, 450 include auxiliary roadside units 410, 420, 430, 440 and the fifth roadside unit 450. The auxiliary roadside units 410, 420, 430, and 440 include a first roadside unit 410, a second roadside unit 420, a third roadside unit 430, and a fourth roadside unit 440. FIG. 4B additionally shows an estimated position 402 of the PM vehicle and a corrected position 404 of the PM vehicle.

Hereinafter, to correct the estimated position, the fifth roadside unit 450 is described as a reference roadside unit which is merely an illustrative embodiment, and the reference roadside unit may be implemented by one or more of the second roadside unit 420, third roadside unit 430, fourth roadside unit 440, and fifth roadside unit 450. In particular, the traffic information providing device (not shown) is supposed to know in advance the position coordinates of the plurality of roadside units 410, 420, 430, 440, 450. Meanwhile, the auxiliary roadside units 410, 420, 430, and 440 are merely illustrative of an embodiment, and the auxiliary roadside units may be composed of at least three of them.

The fifth roadside unit 450 may be configured to receive V2X messages from the auxiliary roadside units 410, 420, 430, 440. The traffic information providing device may be configured to estimate the position of the fifth roadside unit 450 based on at least one of the RSSIs or the ToF values of the V2X messages received by the fifth roadside unit 450, or the positions of the auxiliary roadside units 410, 420, 430, 440. As shown in FIG. 4A, the traffic information providing device may be configured to deduce the estimated position 452 of the fifth roadside unit 450.

However, the fifth roadside unit 450 may not be true to the estimated position 452 due to signal distortion by weather or obstacles, a roadside unit failure, etc. The traffic information providing device may use an estimation error for the fifth roadside unit 450 based on a known actual position of the fifth roadside unit 450 and thereby deduce the actual position 400 of the PM vehicle accurately. In particular, the traffic information providing device may be configured to more accurately deduce the actual position 400 of the PM vehicle by using a distance error rate, a distance error, and a position error.

As a first exemplary embodiment, to use the distance error rate, the traffic information providing device may be configured to calculate, based on at least one of received signal strength indicator or time-of-flight value of the V2X message received by the fifth roadside unit 450, a distance d1' between the fifth roadside unit's estimated position 452 and the first roadside unit 410. The traffic information providing device may further be configured to calculate a distance d1 between the actual position of the fifth roadside unit 450 and the first roadside unit 410.

The traffic information providing device may be configured to calculate an error rate between two distances d1 and d1' (hereinafter, a first distance error rate). Specifically, the first distance error rate refers to a ratio of $d_1$ to $d_1'$. In other words, the distance error rate refers to the actual distance to the estimated distance. Additionally, the traffic information providing device may be configured to calculate a second distance error rate $d_2$ to $d_2'$, a third distance error rate $d_3$ to $d_3'$, and a fourth distance error rate $d_4$ to $d_4'$ for the second roadside unit 420, the third roadside unit 430, and the fourth roadside unit 440, respectively.

As shown in FIG. 4B, the traffic information providing device may utilize the distance error rates for correcting the estimated position 402 of the PM vehicle and thereby deduce the corrected position 404 of the PM vehicle. Specifically, the PM vehicle may be configured to receive V2X messages from the auxiliary roadside units 410, 420, 430, and 440. The traffic information providing device may be configured to obtain the estimated position 420 of the PM vehicle based on at least one of the RSSIs or the ToF values of the V2X messages received by the PM vehicle, or the positions of the auxiliary roadside units 410, 420, 430, and 440. In particular, the traffic information providing device may be configured to calculate the estimated position 420 of the PM vehicle through triangulation using the positions of at least three of the auxiliary roadside units 410, 420, 430, 440, and the RSSIs or the ToF values of the V2X messages received from the three roadside units. At this time, the distances between the PM vehicle' estimated position 402 and the auxiliary roadside units 410, 420, 430, 440 are $x_1'$, $x_2'$, $x_3'$, $x_4'$, respectively.

The traffic information providing device may be configured to obtain the corrected distances by multiplying the distances between the PM vehicle' estimated position 402 and the auxiliary roadside units 410, 420, 430, 440 by the distance error rates. For example, the traffic information providing device may multiply a distance $x1'$ by distance error rate $d_1/d_1'$ to obtain a corrected distance $x_1''$ of the first roadside unit 410. Additionally, the traffic information providing device may further obtain corrected distances $x_2''$, $x_1''$, and $x_4''$ of the second, third, and fourth roadside units 420, 430, 440.

The distances between the corrected position 404 of the PM vehicle and the auxiliary roadside units 410, 420, 430, 440 may be expressed as Equation 1.

$$x'' = x' \times \frac{d}{d'} \qquad \text{Equation 1}$$

In Equation 1, $x''$ denotes the distance between the PM vehicle' corrected position 404 and the auxiliary roadside units 410, 420, 430, 440. In addition, $x'$ is the distance between the PM vehicle' estimated position 402 and the auxiliary roadside units 410, 420, 430, 440. Also, d is the distance between the fifth roadside unit's estimated position 452 and the auxiliary roadside units 410, 420, 430, 440 and d' is the distance between the actual position of the fifth roadside unit 450 and the auxiliary roadside units 410, 420, 430, and 440.

The traffic information providing device may be configured to calculate the corrected position 404 of the PM vehicle through triangulation based on at least three of distances $x_1''$, $x_2''$, $x_3''$, and $x_4''$. With the errors between the actual distance and the estimated distances between the fifth roadside unit 450 and the auxiliary roadside units 410, 420, 430, 440 reflected in the PM vehicle' estimated position 402, the corrected position 404 of the PM vehicle comes closer to the actual position 400 thereof compared to the PM vehicle' estimated position 402 alone. The traffic information providing device may also be configured to correct the estimated position 402 of the PM vehicle using an error rate for one of the RSSIs or the ToF values instead of distances.

As a second exemplary embodiment, to use the distance error, the traffic information providing device may be configured to calculate an error between two distances of $d_1$ and $d_1'$ (hereinafter, a first distance error). Specifically, the first distance error refers to a value of $d_1$ minus $d_1'$. Additionally, the traffic information providing device may be configured to calculate a second distance error, a third distance error, and a fourth distance error for the second roadside unit 420, the third roadside unit 430, and the fourth roadside unit 440, respectively.

As shown in FIG. 4B, the traffic information providing device may utilize the distance errors for correcting the estimated position 402 of the PM vehicle and thereby deduce the corrected position 404 thereof. Specifically, the PM vehicle may be configured to receive V2X messages from the auxiliary roadside units 410, 420, 430, 440. The traffic information providing device may be configured to obtain the PM vehicle' estimated position 402 based on at least one of the RSSIs or the ToF values of the V2X messages received by the PM vehicle, and the positions of the auxiliary roadside units 410, 420, 430, 440 included in the V2X messages. At this time, the distances between the PM vehicle' estimated position 402 and the roadside units 410, 420, 430, 440 are $x_1'$, $x_2'$, $x_3'$, and $x_4'$, respectively.

The traffic information providing device may be configured to obtain the corrected distances by adding distance errors to the respective distances between the PM vehicle' estimated position 402 and the auxiliary roadside units 410, 420, 430, 440. For example, the traffic information providing device may add $(d_1-d_1')$ to distance $x'$ and thereby obtain distance $x''$. Additionally, the traffic information providing device may further obtain distances $x_2''$, $x_3''$, and $x_4''$ after correction.

The distances between the PM vehicle corrected position 404 and the auxiliary roadside units 410, 420, 430, and 440 may be expressed as Equation 2.

$$x''=x'+(d-d') \qquad \text{Equation 2}$$

The traffic information providing device may calculate the corrected position 404 of the PM vehicle through triangulation based on at least three of distances $x_1''$, $x_2''$, $x_3''$, and $x_4''$ after correction. With the errors between the actual distance and the estimated distances between the fifth roadside unit 450 and the auxiliary roadside units 410, 420, 430, 440 reflected in the PM vehicle' estimated position 402, the corrected position 404 of the PM vehicle comes closer to the actual position 400 thereof compared to the PM vehicle' estimated position 402 alone. The traffic information providing device may also be configured to correct the estimated position 402 of the PM vehicle using an error of one of received signal strength indicators or time-of-flight values instead of distances.

As a third exemplary embodiment, to use the position error, the traffic information providing device may be configured to calculate the difference between the actual position of the fifth roadside unit 450 and the fifth roadside unit's estimated position 452 (hereinafter, position error). In particular, the position may refer to 2-dimensional location coordinates or 3-dimensional location coordinates. The position error may be calculated by operating for each dimension. The traffic information providing device may be configured to obtain the estimated position 402 of the PM vehicle and then correct the PM vehicle' estimated position 402 by a position error for the fifth roadside unit 450 and thereby deduce the corrected position 404 of the PM vehicle.

Meanwhile, the traffic information providing device may be configured to receive, from the fifth roadside unit 450, at least one of the RSSIs or the ToF values of the V2X messages received by the fifth roadside unit 450, and the positions of the auxiliary roadside units 410, 420, 430, 440, included in the V2X messages. Additionally, the traffic information providing device may be configured to receive, from the PM vehicle, at least one of the RSSIs or the ToF values of the V2X messages received by the PM vehicle, and the positions of the auxiliary roadside units 410, 420, 430, 440, included in the V2X messages.

The traffic information providing device may be configured to either perform real-time calculations of the distance error rates, distance errors, and position errors between the fifth roadside unit 450 and the auxiliary roadside units 410, 420, 430, 440 or have the same calculated and stored in advance. Additionally, the traffic information providing device may be configured to receive, from the fifth roadside unit 450, information items on errors calculated in advance by the fifth roadside unit 450. The traffic information providing device may be configured to deduce the exact position of the PM vehicle through the above-described three error corrections. The traffic information providing device provides the PM vehicle with the corrected position, not the estimated position.

FIG. 5 is a flowchart of a method of operating a traffic information providing device located outside a PM vehicle, according to at least one exemplary embodiment of the present disclosure. The traffic information providing device may be configured to receive, from the PM vehicle, at least one of the RSSIs or the ToF values of V2X messages that the PM vehicle received from the adjacent roadside units, and receive the identification information and transmission time points included in the V2X messages (S500). The traffic information providing device may be configured to deduce the position and the prediction route of the PM vehicle based on at least one of the RSSIs or the ToF values, and based on the identification information and the transmission time points (S502).

To deduce the position of the PM vehicle, the traffic information providing device according to at least one exemplary embodiment may be configured to calculate the distances between the PM vehicle and the roadside units based on at least one of the RSSIs or the ToF values of the signals that the PM vehicle received from the roadside units. Thereafter, the traffic information providing device may be configured to deduce the position of the PM vehicle based on the positions of the roadside units, which are previously stored in response to the identification information of the roadside units, and distances between the PM vehicle and the roadside units.

Additionally, to deduce the prediction route of the PM vehicle, the traffic information providing device according to at least one exemplary embodiment may be configured to receive, from the PM vehicle having moved on, subsequent V2X messages that the PM vehicle received from the roadside units. Thereafter, the traffic information providing device may be configured to deduce at least one of the driving direction and the prediction route of the PM vehicle based on at least one of the transmission time points of the V2X messages and the subsequent V2X messages, the time intervals between the transmission time points between the V2X messages and the subsequent V2X messages. Additionally, the traffic information providing device may be configured to deduce a prediction route in response to receiving subscriber information and destination information from a user, and deduce a prediction route using the learned prediction model.

The traffic information providing device may be configured to determine one or more essential traffic lights among a plurality of traffic lights according to the position and the prediction route of the PM vehicle (S504). In particular, the one or more essential traffic lights may be at least one of a vehicle traffic light located on a straight path of the PM vehicle, a crosswalk traffic light located on a left turn path, or a crosswalk traffic light located on a right turn path.

Additionally, one or more essential traffic lights may be configured to transmit at least one of a type of signal, a remaining time of a signal, or an upcoming signal.

The traffic information providing device may be configured to transmit identification information of the one or more essential traffic lights to the PM vehicle (S506). The PM vehicle may be configured to selectively receive signal information by using the identification information of the one or more essential traffic lights. The traffic information providing device according to at least one exemplary embodiment may be configured to receive, from an intelligent traffic system, traffic information including at least one of a traffic volume according to the prediction route and an accident event notification. The traffic information providing device may be configured to additionally provide the PM vehicle with at least one of the traffic volume according to the prediction route, the accident event notification, pre-stored sign information, or identification information of the plurality of traffic lights. In particular, the traffic information providing device may be configured to perform mapping of the traffic information to a virtual map or a high-definition map and provide the mapped high-definition map to the PM vehicle.

Although Steps S500 to S506 in FIG. 5 are described to be performed sequentially, they merely instantiate the technical idea of some embodiments of the present disclosure. Therefore, a person having ordinary skill in the pertinent art could incorporate various modifications, additions, and substitutions in practicing the present disclosure by changing the sequence described by FIG. 5 or by performing one or more of Steps S500 to S506 in FIG. 5 in parallel, without departing from the gist and the nature of the at least one embodiment of the present disclosure, and hence Steps S500 to S506 in FIG. 5 are not limited to the illustrated chronological sequences.

The steps illustrated in FIG. 5 may be implemented as computer-readable codes on a non-transitory computer-readable recording medium. The non-transitory computer-readable recording medium includes any type of recording device on which data that can be read by a computer system are recordable. Examples of the non-transitory computer-readable recording medium include non-transitory medium such as a ROM, a RAM, a CD-ROM, a magnetic tape, a floppy disk, and an optical data storage and transitory medium such as a carrier wave (e.g., transmission through the Internet) and data transmission medium. Further, the non-transitory computer-readable recording medium may be distributed in computer systems connected via a network, wherein the non-transitory computer-readable codes may be stored and executed in a distributed mode.

As described above, according to some exemplary embodiments of the present disclosure, the traffic information providing device and method may inform the PM vehicle of traffic signal according to the position and the prediction route of the PM vehicle and thereby smooth the traffic flow of the PM vehicle and promote user convenience. According to some other exemplary embodiments of the present disclosure, a traffic information providing device and a traffic information providing method may more accurately inform the PM vehicle of traffic signals according to the position of the PM vehicle with or without a GPS support by more accurately identifying the position of the PM vehicle not only across city streets but also in an indoor space or a GPS dead zone.

According to yet other exemplary embodiments of the present disclosure, a traffic information providing device and a traffic information providing method unlike a satellite signal-based GPS, which, however, utilize roadside units at fixed positions to estimate the position of the PM vehicle and subsequently perform an additional correction process, thereby reducing positioning errors, increasing the reliability of positioning-based services, and increasing the applicability of location-based services.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof

What is claimed is:

1. A computer implemented method for providing traffic information to a personal mobility vehicle (PM vehicle), comprising:

estimating, by a controller, a position of the PM vehicle based on at least one of Received Signal Strength Indicators (RSSIs) or Time of Flight (ToF) values of messages between the PM vehicle and road side units (RSUs);

predicting, by the controller, a route of the PM vehicle;

determining, by the controller, one or more traffic lights among a plurality of traffic lights according to the position and the predicted route of the PM vehicle; and transmitting, by the controller, identification information of the one or more traffic lights to the PM vehicle;

wherein estimating the position of the PM vehicle includes:

estimating a candidate position of the PM vehicle based on messages transmitted from a plurality of auxiliary RSUs; and correcting the candidate position of the PM vehicle based on a correction data;

wherein the correction data are distance error rates being ratios of actual distance to estimated distance between a reference RSU and the plurality of auxiliary RSU, distance errors being differences between the actual distances and the estimated distances, and a position error being a difference between an estimated position and an actual position of the reference RSU;

wherein the actual distances are based on known positions of the reference RSU and the plurality of auxiliary RSUs; and wherein the estimated distances are based on messages between the reference RSU and the plurality of auxiliary RSUs.

2. The method of claim 1, wherein the one or more traffic lights include:

at least one of a vehicle traffic light located on a straight path of the PM vehicle, a crosswalk traffic light located on a left turn path, or a crosswalk traffic light located on a right turn path.

3. The method of claim 1, wherein the predicting of the route of the PM vehicle includes:

receiving, from the PM vehicle having moved on, subsequent messages that the PM vehicle received from the RSUs; and determining a driving direction of the PM vehicle based on at least one of the transmission time points of the messages, transmission time points of the subsequent messages, time intervals between the transmission points of the messages and the transmission points of the subsequent messages, and the pre-stored positions of the RSUs.

4. The method of claim 3, wherein the predicting of the route of the PM vehicle includes:

receiving, from the PM vehicle, destination information inputted from a user to the PM vehicle;

predicting the route based on the position of the PM vehicle and the destination information; and resetting the predicted route, when the position of the PM vehicle deviates from the predicted route, based on a deviated position of the PM vehicle.

5. The method of claim 1, wherein the predicting of the route of the PM vehicle includes:

receiving, from the PM vehicle, subscriber information and destination information inputted by a user to the PM vehicle; and predicting the route of the PM vehicle by using a prediction model based on the subscriber information, the destination information, and the position of the PM vehicle.

6. The method of claim 1, further comprising:

receiving, from an intelligent transport system (ITS), traffic information including at least one of a traffic volume along the predicted route or an accident event notification; and outputting a notification to the PM vehicle of at least one of the traffic volume along the predicted route, the accident event notification, pre-stored sign information, or the identification information of the plurality of traffic lights.

7. The method of claim 6, wherein the outputting the notification to the PM vehicle includes:

mapping at least one of the identification information of the plurality of traffic lights, the traffic volume along the predicted route, the accident event notification, or the pre-stored sign information, to a high-definition map; and transmitting a mapped high-definition map to the PM vehicle.

8. The method of claim 1, wherein the one or more traffic lights are configured to transmit at least one of a signal type, a remaining time to signal, or an upcoming signal.

9. The method of claim 1, wherein the RSUs and the plurality of traffic lights are configured to perform broadcasting.

10. A computer implemented method for providing traffic information to a personal mobility vehicle (PM vehicle), comprising:

estimating a position of a PM vehicle based on at least one of Received Signal Strength Indicators (RSSIs) or Time-Of-Flight (ToF) values of messages between the PM vehicle and road side units (RSUs);

predicting a route of the PM vehicle;

determining one or more traffic lights among a plurality of traffic lights according to the position and the predicted route of the PM vehicle;

receiving signal information from the one or more traffic lights based on identification information of the one or more traffic lights; and outputting the signal information of the one or more traffic lights;

wherein estimating the position of the PM vehicle includes:

estimating a candidate position of the PM vehicle based on messages transmitted from a plurality of auxiliary RSUs; and correcting the candidate position of the PM vehicle based on a correction data;

wherein the correction data are distance error rates being ratios of actual distance to estimated distance between a reference RSU and the plurality of auxiliary RSU, distance errors being differences between the actual distances and the estimated distances, and a position error being a difference between an estimated position and an actual position of the reference RSU;

wherein the actual distances are based on known positions of the reference RSU and the plurality of auxiliary RSUs; and wherein the estimated distances are based on messages between the reference RSU and the plurality of auxiliary RSUs.

11. The method of claim 10, wherein the one or more traffic lights include:

at least one of a vehicle traffic light located on a straight path of the PM vehicle, a crosswalk traffic light located on a left turn path, or a crosswalk traffic light located on a right turn path.

12. The method of claim 10, wherein the predicting of the route of the PM vehicle includes:

receiving, after the PM vehicle moves, subsequent messages from the RSUs; and determining a driving direction of the PM vehicle based on at least one of the transmission time points of the messages, transmission time points of the subsequent messages, time intervals between the transmission points of the messages and the transmission points of the subsequent messages, and the pre-stored positions of the RSUs.

13. The method of claim 12, wherein the predicting of the route of the PM vehicle includes:

receiving destination information from a user;

predicting the route based on the position of the PM vehicle and the destination information; and resetting the predicted route when the position of the PM vehicle deviates from the predicted route, based on a deviated position of the PM vehicle.

14. The method of claim 10, wherein the predicting of the route of the PM vehicle includes:

receiving subscriber information and destination information from a user; and predicting the route of the PM vehicle using a prediction model based on the subscriber information, the destination information, and the position of the PM vehicle.

15. The method of claim 10, further comprising:

receiving, from a server, traffic information including at least one of a traffic volume along the predicted route or an accident event notification, wherein the outputting of the signal information further includes outputting at least one of the traffic volume along the predicted route, the accident event notification, the signal information received from the plurality of traffic lights, or pre-stored sign information.

16. The method of claim 10, wherein the one or more traffic lights are configured to transmit at least one of a signal type, a remaining time to signal, or an upcoming signal.

17. A device for providing traffic information to a personal mobility vehicle (PM vehicle), comprising:

at least one memory storing computer-executable instructions; and at least one processor configured to execute the computer-executable instructions to:

estimate a position of the PM vehicle based on at least one of Received Signal Strength Indicators (RSSIs) or Time of Flight (ToF) values of messages between the PM vehicle and road side units (RSUs); and predict a route of the PM vehicle;

determine one or more traffic lights among a plurality of traffic lights according to the position and the predicted route of the PM vehicle; and transmit identification information of the one or more traffic lights to the PM vehicle; wherein estimating the position of the PM vehicle includes:

estimating a candidate position of the PM vehicle based on messages transmitted from a plurality of auxiliary RSUs; and correcting the candidate position of the PM vehicle based on a correction data;

wherein the correction data are distance error rates being ratios of actual distance to estimated distance between a reference RSU and the plurality of auxiliary RSU, distance errors being differences between the actual distances and the estimated distances, and a position error being a difference between an estimated position and an actual position of the reference RSU;

wherein the actual distances are based on known positions of the reference RSU and the plurality of auxiliary RSUs; and wherein the estimated distances are based on messages between the reference RSU and the plurality of auxiliary RSUs.

18. A device for providing traffic information to a personal mobility vehicle (PM vehicle), comprising:

at least one memory storing computer-executable instructions; and at least one processor configured to execute the computer-executable instructions to:

estimate a position of a PM vehicle based on at least one of Received Signal Strength Indicators (RSSIs) or Time-Of-Flight (ToF) values of messages between the PM vehicle and t; and predict a route of the PM vehicle;

determine one or more traffic lights among a plurality of traffic lights according to the position and the predicted route of the PM vehicle;

receive signal information from the one or more traffic lights based on identification information of the one or more traffic lights; and output the signal information of the one or more traffic lights;

wherein estimating the position of the PM vehicle includes:

estimating a candidate position of the PM vehicle based on messages transmitted from a plurality of auxiliary RSUs; and correcting the candidate position of the PM vehicle based on a correction data;

wherein the correction data are distance error rates being ratios of actual distance to estimated distance between a reference RSU and the plurality of auxiliary RSU, distance errors being differences between the actual distances and the estimated distances and a position error being a difference between an estimated position and an actual position of the reference RSU;

wherein the actual distances are based on known positions of the reference RSU and the plurality of auxiliary RSUs; and wherein the estimated distances are based on messages between the reference RSU and the plurality of auxiliary RSUs.

* * * * *